US010377314B1

(12) United States Patent
Peterson

(10) Patent No.: US 10,377,314 B1
(45) Date of Patent: Aug. 13, 2019

(54) LOAD STRAP HANGER SYSTEM

(71) Applicant: John Lester Peterson, Bluffdale, UT (US)

(72) Inventor: John Lester Peterson, Bluffdale, UT (US)

( * ) Notice: Subject to any disclaimer, the term of this patent is extended or adjusted under 35 U.S.C. 154(b) by 0 days.

(21) Appl. No.: 15/916,031

(22) Filed: Mar. 8, 2018

(51) Int. Cl.
*B60P 3/14* (2006.01)
*B60R 5/00* (2006.01)

(52) U.S. Cl.
CPC ................ *B60R 5/003* (2013.01); *B60P 3/14* (2013.01)

(58) Field of Classification Search
CPC ........... B60R 5/003; B60R 11/06; B25H 5/00; B25H 3/04; B60P 3/14; B62J 9/006; A47F 5/0846
USPC ............. 224/560, 558; 211/106.01; 248/210, 248/226.11
See application file for complete search history.

(56) References Cited

U.S. PATENT DOCUMENTS 3,878,939 A * 4/1975 Wilcox .................. B25H 3/021 190/18 A
7,669,723 B2 * 3/2010 Kao ......................... B25H 3/04 206/349
7,798,463 B2 * 9/2010 Morgenroth ........... A47G 1/164 211/106.01
8,662,300 B1 * 3/2014 Arena ...................... B25H 3/00 206/372
9,180,591 B2 * 11/2015 McLean ................ A47F 5/0846
9,346,392 B1 * 5/2016 Neal ..................... B60P 7/0815
2008/0029562 A1 * 2/2008 Hawkins ................... A45F 3/04 224/153
2014/0103000 A1 * 4/2014 Avissar ............. A47G 25/0614 211/85.3

* cited by examiner

*Primary Examiner* — Adam J Waggenspack
(74) *Attorney, Agent, or Firm* — Perry S. Clegg; Kunzler Bean & Adamson, PC

(57) ABSTRACT

A hanger apparatus includes a mounting plate configured to mount to a cargo vehicle, a plurality of hook apparatuses mounted to a first side of the mounting plate, wherein each hook apparatus extends out and up from the mounting plate, and at least one ladder apparatus mounted to the first side of the mounting plate. The ladder apparatus includes a plurality of horizontal pins extending between side rails, wherein the side rails are mounted to mounting plate and the horizontal pins are spaced apart from the mounting plate.

18 Claims, 7 Drawing Sheets

LOAD STRAP HANGER SYSTEM

FIELD

This disclosure relates generally to hanger apparatuses, and more particularly to hanger apparatuses for tie down straps for cargo vehicles.

BACKGROUND

Many mechanisms are utilized to store and hang tie down straps. The differences between the connectors on tie down straps makes it so no mechanism is sufficient to accommodate the varieties of tie down straps. As such, tie down straps are stored in different places away from each other or worse left on a floor with the chance of being damaged by hand carts or heavy cargo.

SUMMARY

The subject matter of the present application has been developed in response to the present state of the art, and in particular, in response to the problems and disadvantages associated with conventional hanger systems that have not yet been fully solved by currently available techniques. Accordingly, the subject matter of the present application has been developed to provide embodiments of a system, an apparatus, and a method that overcome at least some of the above-discussed shortcomings of prior art techniques. For example, according to one implementation, a hanger apparatus is disclosed, which facilitates the hanging of different types of tie down straps on a single apparatus.

Disclosed herein is a hanger apparatus. The hanger apparatus includes a mounting plate configured to mount to a cargo vehicle, a plurality of hook apparatuses mounted to a first side of the mounting plate, wherein each hook apparatus extends out and up from the mounting plate, and at least one ladder apparatus mounted to the first side of the mounting plate. The ladder apparatus includes a plurality of horizontal pins extending between side rails, wherein the side rails are mounted to mounting plate and the horizontal pins are spaced apart from the mounting plate. The preceding subject matter of this paragraph characterizes example 1 of the present disclosure.

The hanger apparatus includes a track connector mounted to a second side of the mounting plate, wherein the second side is an opposite side to the first side of the mounting plate, wherein the track connector is configured to couple the hanger apparatus to a track. The preceding subject matter of this paragraph characterizes example 2 of the present disclosure, wherein example 2 also includes the subject matter according to example 1, above.

The hanger apparatus includes a plurality of track connectors mounted to the second side of the mounting plate. The preceding subject matter of this paragraph characterizes example 3 of the present disclosure, wherein example 3 also includes the subject matter according to any of examples 1 and 2, above.

The plurality of track connectors are rotatably coupled to the second side of the mounting plate, wherein an orientation of each track connector is configured to rotate relative to the mounting plate. The preceding subject matter of this paragraph characterizes example 4 of the present disclosure, wherein example 4 also includes the subject matter according to example 3, above.

The hanger apparatus includes a plurality of hook apparatuses are positioned in at least two horizontal rows. The preceding subject matter of this paragraph characterizes example 5 of the present disclosure, wherein example 5 also includes the subject matter according to any one of examples 1-4, above.

The a plurality of ladder apparatuses mounted to the first side of the mounting plate, wherein a first ladder apparatus is positioned at a first end of the first side and a second ladder apparatus is positioned at a second end of the first side, and wherein the plurality of hook apparatuses are positioned between the first ladder apparatus and the second ladder apparatus. The preceding subject matter of this paragraph characterizes example 6 of the present disclosure, wherein example 6 also includes the subject matter according to any one of examples 1-5, above.

The hanger apparatus is configured to mount to a track. The preceding subject matter of this paragraph characterizes example 7 of the present disclosure, wherein example 7 also includes the subject matter according to any one of examples 1-6, above.

The hook apparatuses are staggered horizontally on the first side of the mounting plate. The preceding subject matter of this paragraph characterizes example 8 of the present disclosure, wherein example 8 also includes the subject matter according to any one of examples 1-7, above.

The plurality of track connectors are oriented in a same direction, wherein the plurality of track connectors are configured to couple to a single track, wherein the track is an E-track. The preceding subject matter of this paragraph characterizes example 9 of the present disclosure, wherein example 9 also includes the subject matter according to any one of examples 1-8, above.

The track is mounted to an interior wall of a cargo vehicle. The preceding subject matter of this paragraph characterizes example 10 of the present disclosure, wherein example 10 also includes the subject matter according to any one of examples 1-9, above.

The mounting plate comprises a plurality of mounting holes configured to allow the mounting plate to be mounted to an interior wall of a cargo vehicle. The preceding subject matter of this paragraph characterizes example 11 of the present disclosure, wherein example 11 also includes the subject matter according to example 1, above.

Also disclosed herein is a system. The system includes a track configured to be mounted to a cargo vehicle and a hanger apparatus. The hanger apparatus includes a mounting plate, a plurality of hook apparatuses mounted to a first side of the mounting plate, wherein each hook apparatus extends out and up from the mounting plate, and at least one ladder apparatus mounted to the first side of the mounting plate. The ladder apparatus includes a plurality of horizontal pins extending between side rails, wherein the side rails are mounted to mounting plate and the horizontal pins are spaced apart from the mounting plate. The hanger apparatus further includes a track connector mounted to a second side of the mounting plate, wherein the second side is an opposite side to the first side of the mounting plate, wherein the track connector is configured to couple the hanger apparatus to the track. The preceding subject matter of this paragraph characterizes example 12 of the present disclosure.

The system further includes a plurality of track connectors mounted to the second side of the mounting plate. The preceding subject matter of this paragraph characterizes example 13 of the present disclosure, wherein example 13 also includes the subject matter according to example 12, above.

The plurality of track connectors are rotatably coupled to the second side of the mounting plate, wherein an orientation of each track connector is configured to rotate relative to the mounting plate. The preceding subject matter of this paragraph characterizes example 14 of the present disclosure, wherein example 14 also includes the subject matter according to example 13, above.

The system further includes a plurality of ladder apparatuses mounted to the first side of the mounting plate, wherein a first ladder apparatus is positioned at a first end of the first side and a second ladder apparatus is positioned at a second end of the first side, and wherein the plurality of hook apparatuses are positioned between the first ladder apparatus and the second ladder apparatus. The preceding subject matter of this paragraph characterizes example 15 of the present disclosure, wherein example 15 also includes the subject matter according to any one of examples 12-14, above.

The system further includes the cargo vehicle. The track is mounted to the cargo vehicle, and the track is an E-track. The preceding subject matter of this paragraph characterizes example 16 of the present disclosure, wherein example 16 also includes the subject matter according to any one of examples 12-15, above.

The system further includes a plurality of tie down straps, wherein the plurality of tie down straps comprise different connectors, wherein the connectors including a ratchet and flat hooks. The preceding subject matter of this paragraph characterizes example 17 of the present disclosure, wherein example 17 also includes the subject matter according to any one of examples 12-16, above.

The hook apparatuses are staggered horizontally on the first side of the mounting plate. The preceding subject matter of this paragraph characterizes example 18 of the present disclosure, wherein example 18 also includes the subject matter according to any one of examples 12-17, above.

The mounting plate comprises a plurality of mounting holes configured to allow the mounting plate to be mounted to an interior wall of the cargo vehicle. The preceding subject matter of this paragraph characterizes example 19 of the present disclosure, wherein example 19 also includes the subject matter according to example 13, above.

A hanger apparatus includes a mounting plate configured to mount to a cargo vehicle, a plurality of hook apparatuses mounted to a first side of the mounting plate, wherein each hook apparatus extends out and up from the mounting plate, wherein the plurality of hook apparatuses are positioned in at least two horizontal rows, and wherein the hook apparatuses are staggered horizontally on the first side of the mounting plate. The hanger apparatus further includes a plurality of ladder apparatuses mounted to the first side of the mounting plate, wherein a first ladder apparatus is positioned at a first end of the first side and a second ladder apparatus is positioned at a second end of the first side, and wherein the plurality of hook apparatuses are positioned between the first ladder apparatus and the second ladder apparatus. Each ladder apparatus includes a plurality of horizontal pins extending between side rails, wherein the side rails are mounted to mounting plate and the horizontal pins are spaced apart from the mounting plate. The hanger apparatus further includes a plurality of track connectors mounted to the second side of the mounting plate, wherein the second side is an opposite side to the first side of the mounting plate, wherein the plurality of track connectors are configured to couple the hanger apparatus to the track, and wherein the plurality of track connectors are oriented in a same direction, wherein the plurality of track connectors are configured to couple to a single track. The preceding subject matter of this paragraph characterizes example 20 of the present disclosure.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
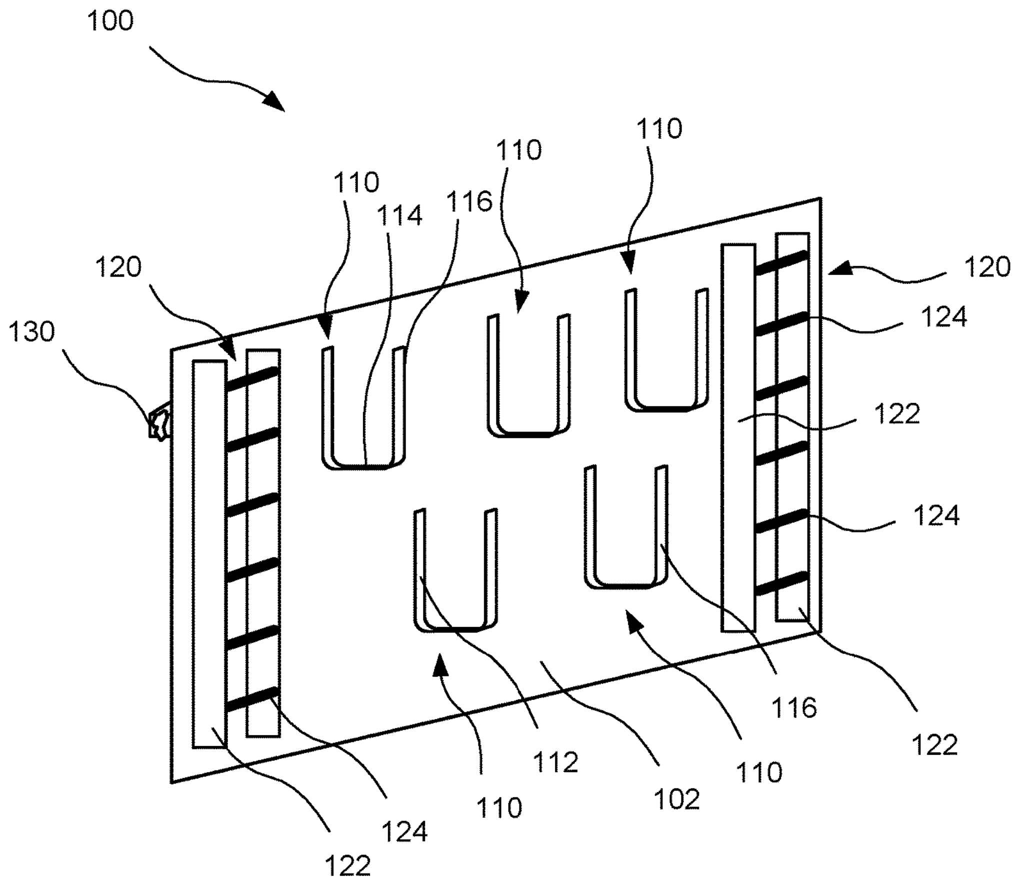
FIG. 1 is a perspective view of a hanger apparatus, according to one or more embodiments of the present disclosure.

Referring to FIG. 1, a perspective view of one embodiment of a hanger apparatus 100 is shown. The hanger apparatus 100 is used to hang a plurality of different types of tie down straps and is further configured to mount to the interior wall of a cargo vehicle. As described in more detail below, the hanger apparatus 100 includes a variety of components that facilitate the hanging of different connectors of tie downs in a single location and on a single apparatus.

Although the hanger apparatus 100 is shown and described with certain components and functionality, other embodiments of the hanger apparatus 100 may include fewer or more components to implement less or more functionality. In addition, although certain components are described in conjunction with a particular Figure, embodiments may include a mixture of features of each Figure described and depicted herein.

The hanger apparatus 100 includes a mounting plate 102 configured to mount to a cargo vehicle 160, a plurality of hook apparatuses 110 mounted to a first side of the mounting plate 102, wherein each hook apparatus 110 extends out and up from the mounting plate 102, and at least one ladder apparatus 120 mounted to the first side of the mounting plate 102. The ladder apparatus 102 includes a plurality of horizontal pins 124 extending between side rails 122, wherein the side rails 122 are mounted to mounting plate 102 and the horizontal pins 124 are spaced apart from the mounting plate 102.

The hanger apparatus includes a mounting plate 102. The mounting plate 102 is a flat rectangular plate configured to permit various components to be mounted thereon, on a first side and/or a second side. The mounting plate 102 may be generally rectangular, square, circular, trapezoidal, or another shape that permits the various components described herein to be mounted thereon. The mounting plate 102 may be made of metal, plastic, polymer, or other durable and rigid or semi-rigid material.

Referring to FIG. 1 a plurality of components are mounted to the mounting plate 102. On a first side, which is shown in FIG. 1, a plurality of hook apparatuses 110 are mounted. The hook apparatuses 110 may be mounted to the mounting plate 102 by use of a high strength adhesive or fastening hardware components such as screws, dowels, cam locks, hooks, pins, etc. The hook apparatuses 110 may be made of metal, plastic, polymer, or other durable and rigid or semi-rigid material. In some embodiments, the hook apparatuses 110 are made of the same material as the mounting plate 102. In an embodiment, the hook apparatus are integral with the mounting plate 102 and merely extend out and up from the mounting plate 102.

In the illustrated embodiment, the hook apparatuses 110 are generally U-shape hooks that are attached to the mounting plate 102 at an adhered rail 112. The hook apparatuses 110 extend out and away from the mounting plate 102 along a horizontal 114. The hook apparatuses 110 further extend up vertically and parallel to the mounting plate 102 along a spaced rail 116. Although shown and described as a generally U-shape, the hook apparatuses 110 may generally include other shapes such as a V-shape, a J-shape, an L-shape, and other similar shapes. The hook apparatuses 110 are configured to hold tie downs having a connector with an eyehole such as ratchets and other looped connectors. The loop or eyehole is placed over the hook apparatuses 110. A plurality of tie downs may be placed on each hook apparatus 110.

The hook apparatuses 110 are positioned in two horizontal rows. A top row of hook apparatuses 110 includes three hook apparatuses 110 spaced evenly apart. A bottom row of hook apparatuses 110 includes two hook apparatuses 110. Each row may include more or less hook apparatuses 110 than what is depicted in FIG. 1. The varying vertical location of the hook apparatuses 110 allows for varying length of tie downs to be accommodated by the hanger apparatus 100.

In addition, the hook apparatuses 110 are staggered horizontally on the first side of the mounting plate 102. That is, no two hook apparatuses 110 are placed directly above or beneath each other. In such embodiments, as the tie down straps hang from the individual hook apparatuses 110, the tie down straps are horizontally separated to allow for quick identification of the tie down straps that are needed for a particular application. This is especially important for two-piece tie downs where two separate pieces need to be matched together to effectively utilize the tie down straps.

The hanger apparatus 100 further includes a plurality of ladder apparatuses 120. In the illustrated embodiment, the hanger apparatus 100 includes two ladder apparatuses 120 on opposite ends of the first side of the mounting plate 102. The first ladder apparatus 120 is positioned at a first end of the first side and a second ladder apparatus 120 is positioned at a second end of the first side. The ladder apparatuses 120, in some embodiments, are positioned such that the hook apparatuses 110 are positioned between the first ladder apparatus 120 and the second ladder apparatus 120. In some embodiments, the ladder apparatuses 120 and the hook apparatuses 110 are periodically staggered with ladder apparatuses 120 positioned between hook apparatuses 110 and/or vice versa.

The ladder apparatus 120 includes a first and second side rail 122 which are coupled to the mounting plate 102. The first and second side rails 122 are parallel to each other and generally vertical oriented. Spanning between the two side rails 122 are a plurality of pins 124 which are coupled to each of the side rails 122 and are generally horizontal or perpendicular to the orientation of the side rails 122. The pins 124 are space apart from the mounting plate 102 leaving a gap 126 (see, for example, FIG. 3) between the pins 124 and the mounting plate 102. The pins 124 allow for a different type of connectors of tie downs to be hung on the hanger apparatus 100, which are different from the type hung on the hook apparatuses 110. The pins 124 are configured to permit the hanging of hook connectors, and most notably flat hooks. The plurality of pins 124 allow for the hanging of a plurality of flat hooks at a position offset from, for example, ratchet tie downs hanging on the hook apparatuses 110. This allows for flat hook tie down strap to be quickly identified and matched with a compatible counterpart piece or matching piece hanging on the hook apparatuses 110. As the pins 124 are vertically separated, a plurality of, for example, flat hooks can be hung on a single ladder apparatus 120 with minimal interference.

In the illustrated embodiment, the ladder apparatuses 120 include six pins 124. More or less pins 124 may be included in different embodiments. Although described as generally vertical, the side rails 122 may, in some embodiments, be tilted slightly to allow for the straps that are hung on the pins 124 to be staggered as they hang. The pins 124 are still generally horizontal but are not directly above or beneath a neighboring pin 124.

The ladder apparatuses 120 and, more specifically, the side rails 122 may be mounted to the mounting plate 102 by use of a high-strength adhesive or glue or fastening hardware components such as screws, dowels, cam locks, hooks, pins, etc. In some embodiments, the ladder apparatuses 120 are integral with the mounting plate 102.

In some embodiments, the hanger apparatus 100 includes track connectors 130. Track connectors 130 are mounted to a second side of the mounting plate 102. The second side is an opposite side to the first side of the mounting plate 102. Referring to FIG. 1, the second side is not visible. A portion of a track connector 130 is partially visible. The track connectors 130 are configured to couple the hanger apparatus 100 to a track 150 (such as an E-track or an L-track or another type of track that can be mounted to the interior wall of a cargo truck. The track connectors 130 allow for quick and easy mounting of the hanger apparatus 100 on an interior wall of a cargo vehicle, particularly if the interior wall includes a track compatible with the track connectors.

The track connectors 130 are coupled to the second side of the mounting plate 102. In some embodiments, the track connectors 130 are removably coupled to the second side of the mounting plate 102. In some embodiments, the track connectors 130 are fixedly coupled to the second side of the mounting plate 102. The track connectors 130 may be mounted to the mounting plate 102 by use of a high-strength adhesive or glue or fastening hardware components such as screws, dowels, cam locks, hooks, pins, etc. In some embodiments, the track connectors 130 are integral with the mounting plate 102.

In some embodiments, the track connectors 130 are rotatably coupled to the second side of the mounting plate 102. That is, the track connectors 130 are coupled to the mounting plate 102 but are configured to be able to rotate orientation relative to the mounting plate 102. In other words, the orientation of each track connector 130 is configured to rotate relative to the mounting plate 102. Such embodiments allow for the hanger apparatus 100 to be utilized with horizontal or vertical tracks 150. That is, some tracks 150 require the track connectors 130 to be oriented in the same direction or collinear, while other tracks 150 may require the track connectors 130 to be oriented in the same direction but offset and parallel to each other. Rotatably coupled track connectors 130 allow for the hanger apparatus 100, in such embodiments, to be compatible with different track systems mounted within cargo vehicles.

Figure 3:
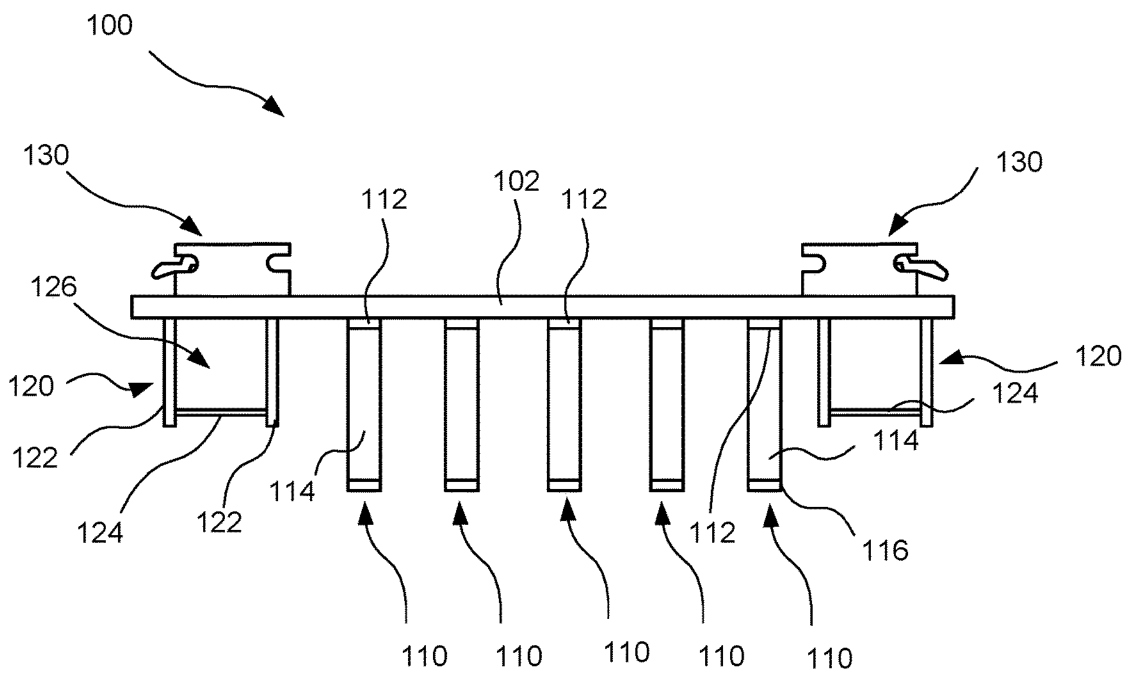
FIG. 3 is a top view of a hanger apparatus, according to one or more embodiments of the present disclosure.
Figure 4:
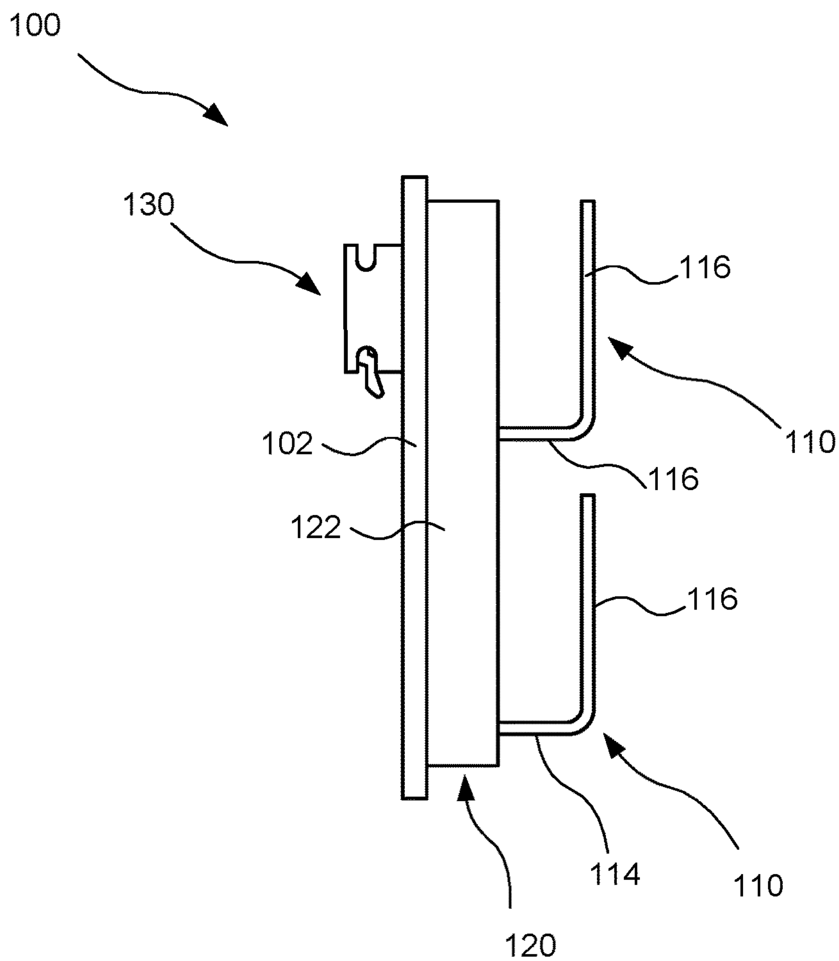
FIG. 4 is a side view of a hanger apparatus, according to one or more embodiments of the present disclosure.

As depicted in top view of FIG. 3, the track connectors 130 are oriented horizontally or, in other words, are oriented parallel to the pins 124. Conversely, as depicted in the side view of FIG. 4, the track connectors 130 are oriented vertically or, in other words, are oriented perpendicular to the pins 124. As discussed previously, the orientations may be fixed or rotatable. In some implementations of the rotatable embodiments, the track connectors 130 are rotatable in ninety degree increments allowing only for generally vertical or generally horizontal orientations.

In some embodiments, the hanger apparatus 100 includes a single track connector 130. In some embodiments, the hanger apparatus 100 includes a plurality of track connectors 130. A plurality of track connectors 130 allow for a more stable coupling of the hanger apparatus 100 to a track 150.

Figure 5:
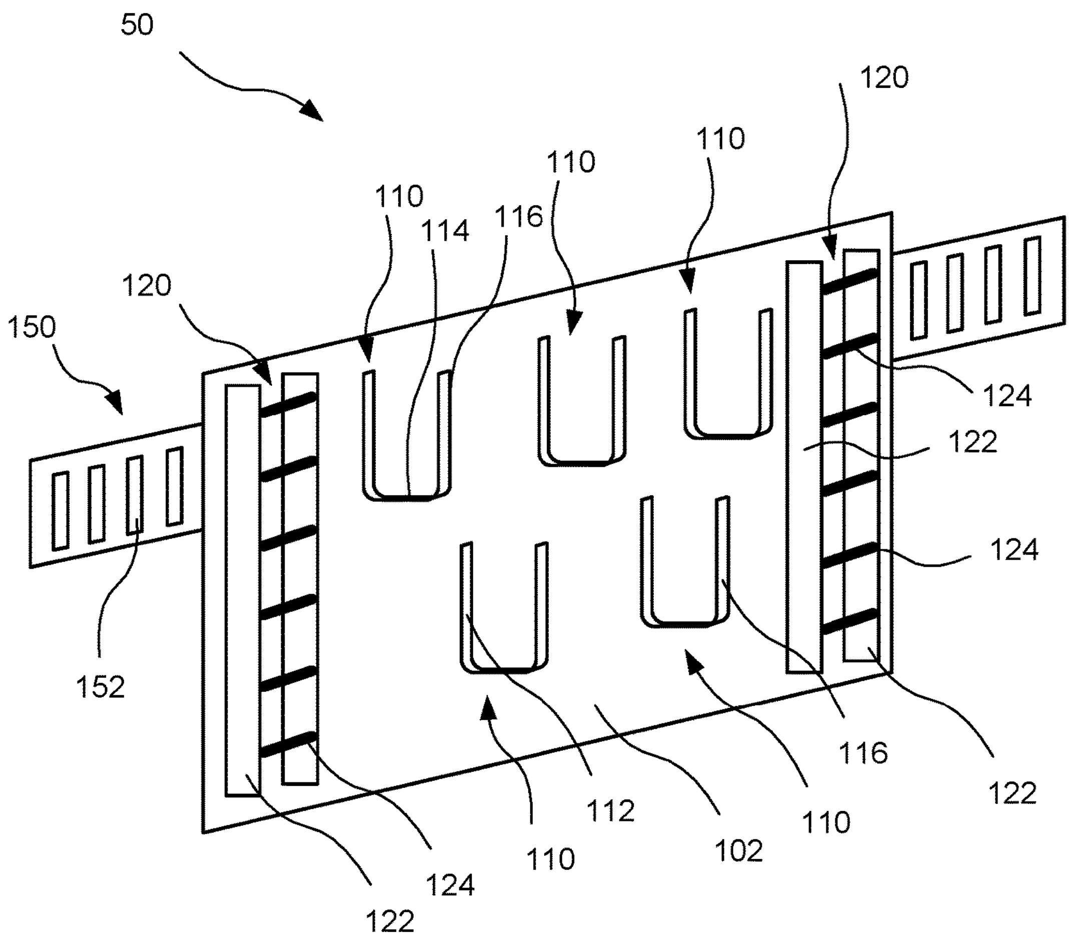
FIG. 5 is a perspective view of a system including a track and hanger apparatus, according to one or more embodiments of the present disclosure.
Figure 6:
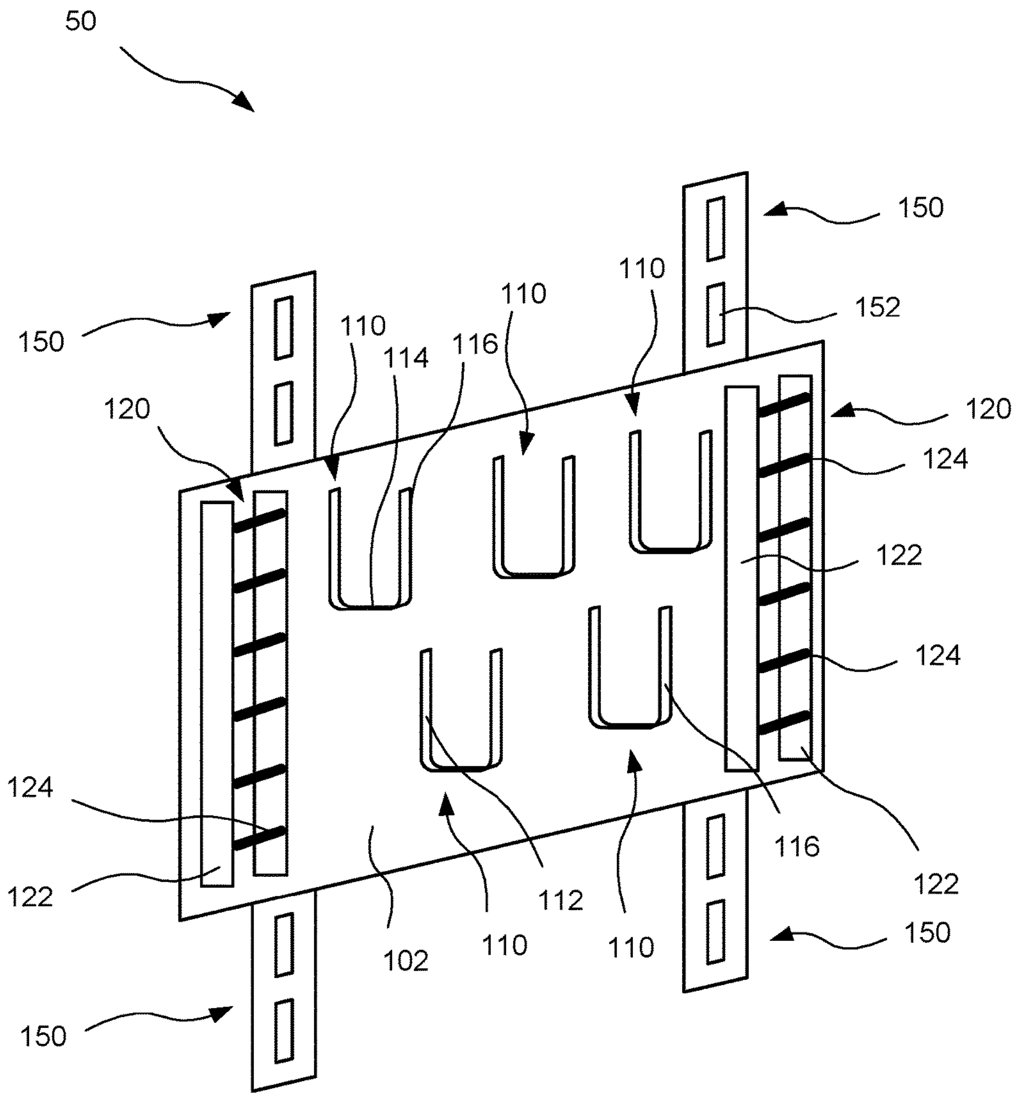
FIG. 6 is a perspective view of a system including a track and hanger apparatus, according to one or more embodiments of the present disclosure.

In some embodiments, the hanger apparatus 100 is configured to mount to a track 150 (see, for example, FIGS. 5 and 6). In FIG. 5, the hanger apparatus 100 is mounted or coupled to a track 150. In the illustrated embodiment, the track 150 is a horizontal E-track but may be any of a number tracks 150 contemplated herein. In the illustrated track connectors 130 (not visible in FIG. 5) are coupled to a single track 150. The track connectors 130 are oriented in a same direction (i.e. vertical) and are parallel to each other. The track connectors 130 couple to the track within the vertical slots 152. It is contemplated that a horizontal track (as shown in FIG. 5) may in some instances include horizontal slots. In such a case, the track connectors 130 would be oriented in a same direction (i.e. horizontal) but would be parallel to each other.

Referring to FIG. 6, the hanger apparatus 100 is mounted or coupled to a pair of vertical E-tracks but may be mounted or coupled to any of a number of tracks 150 contemplated herein. In similar embodiments, the hanger apparatus 100 may be coupled to more than one track 150. In the illustrated embodiment, the track connectors 130 (not visible in FIG. 5) are oriented in a same direction (i.e. vertical) and are parallel to each other. The track connectors 130 couple to the track within the vertical slots 152 of the tracks 150. It is contemplated that a vertical track (as shown in FIG. 6) may in some instances include horizontal slots. In such a case, the track connectors 130 would be oriented in a same direction (i.e. horizontal) but would be parallel to each other and would be coupled to different tracks 150.

In some embodiments, the track 150 is mounted to an interior wall of a cargo vehicle 160. A cargo vehicle 160 may be a box truck, a trailer truck, a van, an aircraft, a boat, or any other similar vehicle that transports cargo.

Figure 2:
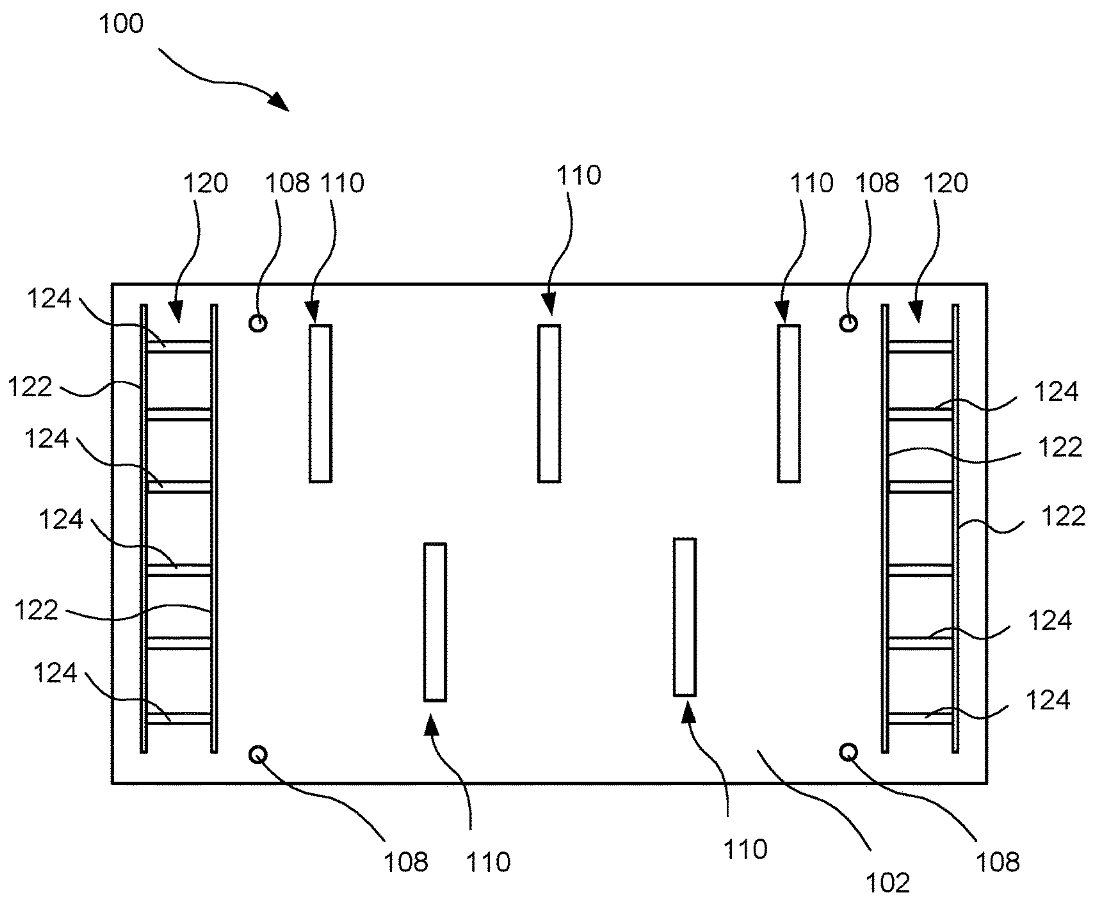
FIG. 2 is a front view of a hanger apparatus, according to one or more embodiments of the present disclosure.

While a plurality of embodiments described herein include track connectors, in an embodiment, the mounting plate includes a plurality of mounting holes 108. The mounting holes 108 (see, for example, FIG. 2) may be utilized to mount the hanger apparatus 100 directly to an interior wall of a cargo vehicle 160 without the need of a track 150.

Also disclosed herein is a system 50. Referring to FIG. 5 the system includes a track 50 configured to be mounted to a cargo vehicle and a hanger apparatus 100. The hanger apparatus 100 includes a mounting plate 102, a plurality of hook apparatuses 110 coupled to a first side of the mounting plate 102, wherein each hook apparatus 110 extends out and up from the mounting plate 102, and two one ladder apparatuses 120 mounted to the first side of the mounting plate 120. The ladder apparatuses 120 each include a plurality of horizontal pins 124 extending between side rails 122, wherein the side rails 122 are mounted to mounting plate 102 and the horizontal pins 124 are spaced apart from the mounting plate 102. The hanger apparatus 100 further includes track connectors 130 (not visible) mounted to a second side of the mounting plate 102, wherein the second side is an opposite side to the first side of the mounting plate 102. The track connectors 130 are configured to couple the hanger apparatus 100 to the track 150. The system 50 may further include the cargo vehicle. The track 150 is mounted to the cargo vehicle 160. In the illustrated embodiment, the track 150 is an E-track.

Referring to FIG. 6, a hanger apparatus according one or more embodiments is shown. The hanger apparatus 100 includes a mounting plate 100 configured to mount to a cargo vehicle and a plurality of hook apparatuses 110 coupled to a first side of the mounting plate 102. Each hook apparatus 110 extends out and up from the mounting plate 102. The plurality of hook apparatuses 110 are positioned in two horizontal rows and the hook apparatuses 110 are staggered horizontally on the first side of the mounting plate 102. The hanger apparatus 100 further includes a plurality of ladder apparatuses 120 mounted to the first side of the mounting plate 102. A first ladder apparatus 120 is positioned at a first end of the first side and a second ladder apparatus 120 is positioned at a second end of the first side of the mounting plate 102. The plurality of hook apparatuses 110 are positioned between the first ladder apparatus 120 and the second ladder apparatus 120. Each ladder apparatus 120 includes a plurality of horizontal pins 124 extending between side rails 122. The side rails 122 are mounted to mounting plate 102 and the horizontal pins 124 are spaced apart from the mounting plate 102. The hanger apparatus 100 further includes a plurality of track connectors 130 (not visible) mounted to the second side of the mounting plate 102, where the second side is an opposite side to the first side of the mounting plate 102. The plurality of track connectors 130 are configured to couple the hanger apparatus 100 to the track 150. The plurality of track connectors 130 are oriented in a same direction. The plurality of track connectors 130 are configured to couple to different tracks 150.

Figure 7:
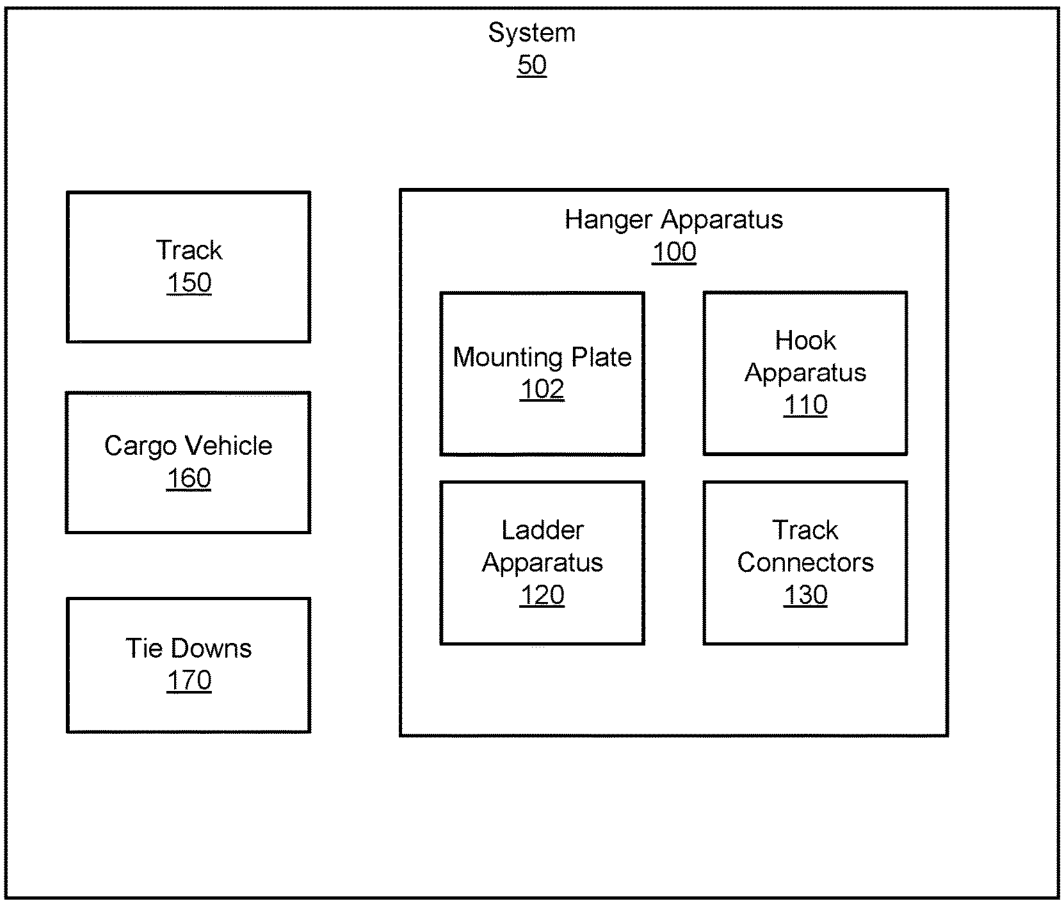
FIG. 7 is a block diagram of a system, according to one or more embodiments of the present disclosure.

Referring now to FIG. 7, a block diagram of a system 50 is shown. The system 50 includes a cargo vehicle 160, a track 150, a hanger apparatus 100, and a plurality of tie downs 170. The hanger apparatus 100 is configured to mount to the track 150. The hanger apparatus 100 includes a mounting plate 102, a plurality of hook apparatuses 110 mounted to a first side of the mounting plate 102, and at least one ladder apparatus 120 mounted to the first side of the mounting plate 102. The hanger apparatus 100 includes track connectors 130. Although not described in detail, the system 50 of FIG. 7 may include some or all of the components described herein in conjunction with FIG. 1-6. The system 50 further includes a plurality of tie down straps 170. In some embodiments, the plurality of tie down straps 170 include different connectors, such as ratchets and flat hooks etc.

Embodiments of methods are described herein. In an embodiment, the method includes a hanger apparatus similar to the embodiments of hanger apparatuses described herein on a track mounted to a cargo vehicle. The method further includes hanging a plurality of tie down straps on the hanger apparatus. The method then ends. Other methods of utilizing a hanger apparatus or assembling a hanger apparatus as described herein are contemplated within this disclosure.

Although described in a depicted order, the method may proceed in any of a number of ordered combinations.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagram included herein is generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A hanger apparatus comprising:

a mounting plate configured to mount to a cargo vehicle;

a plurality of hook apparatuses mounted to a first side of the mounting plate, wherein each hook apparatus extends out and up from the mounting plate; and at least one ladder apparatus non-removably mounted to the first side of the mounting plate, wherein the ladder apparatus comprises a plurality of horizontal pins to hang an object, the plurality of horizontal pins extending only between side rails, wherein the side rails are mounted to the mounting plate and the horizontal pins are spaced apart from the mounting plate, the plurality of hook apparatuses being disposed to one side of the at least one ladder apparatus, wherein both the plurality of hook apparatuses and the at least one ladder are disposed within a bound of the mounting plate.

2. The hanger apparatus according to claim 1, further comprising a track connector mounted to a second side of the mounting plate, wherein the second side is an opposite side to the first side of the mounting plate, wherein the track connector is configured to couple the hanger apparatus to a track.

3. The hanger apparatus according to claim 2, further comprising a plurality of track connectors mounted to the second side of the mounting plate.

4. The hanger apparatus according to claim 3, wherein the plurality of hook apparatuses are positioned in at least two horizontal rows.

5. The hanger apparatus according to claim 3, further comprising a plurality of ladder apparatuses mounted to the first side of the mounting plate, wherein a first ladder apparatus is positioned at a first end of the first side and a second ladder apparatus is positioned at a second end of the first side, and wherein the plurality of hook apparatuses are positioned between the first ladder apparatus and the second ladder apparatus.

6. The hanger apparatus according to claim 5, wherein the hanger apparatus is configured to mount to a track.

7. The hanger apparatus according to claim 3, wherein the hook apparatuses are staggered horizontally on the first side of the mounting plate.

8. The hanger apparatus according to claim 3, wherein the plurality of track connectors are oriented in a same direction, wherein the plurality of track connectors are configured to couple to a single track, wherein the track is an E-track.

9. The hanger apparatus according to claim 8, wherein the track is configured to mount to an interior wall of a cargo vehicle.

10. The hanger apparatus according to claim 1, wherein the mounting plate comprises a plurality of mounting holes configured to allow the mounting plate to be mounted to an interior wall of a cargo vehicle.

11. A system comprising:

a track configured to be mounted to a cargo vehicle; and a hanger apparatus comprising:

a mounting plate;

a plurality of hook apparatuses mounted to a first side of the mounting plate, wherein each hook apparatus extends out and up from the mounting plate;

at least one ladder apparatus non-removably mounted to the first side of the mounting plate, wherein the ladder apparatus comprises a plurality of horizontal pins to hang an object, the plurality of horizontal pins extending only between side rails, wherein the side rails are mounted to mounting plate and the horizontal pins are spaced apart from the mounting plate, the plurality of hook apparatuses being disposed to one side of the at least one ladder apparatus, wherein both the plurality of hook apparatuses and the at least one ladder are disposed within a bound of the mounting plate; and a track connector mounted to a second side of the mounting plate, wherein the second side is an opposite side to the first side of the mounting plate, wherein the track connector is configured to couple the hanger apparatus to the track.

12. The system according to claim 11, further comprising a plurality of track connectors mounted to the second side of the mounting plate.

13. The system according to claim 12, further comprising a plurality of ladder apparatuses mounted to the first side of the mounting plate, wherein a first ladder apparatus is positioned at a first end of the first side and a second ladder apparatus is positioned at a second end of the first side, and wherein the plurality of hook apparatuses are positioned between the first ladder apparatus and the second ladder apparatus.

14. The system according to claim 12, further comprising the cargo vehicle, wherein the track is mounted to the cargo vehicle, and wherein the track is an E-track.

15. The system according to claim 12, further comprising a plurality of tie down straps, wherein the plurality of tie down straps comprise different connectors, wherein the connectors including a ratchet and flat hooks.

16. The system according to claim 12, wherein the hook apparatuses are staggered horizontally on the first side of the mounting plate.

17. The system according to claim 11, wherein the mounting plate comprises a plurality of mounting holes configured to allow the mounting plate to be mounted to an interior wall of the cargo vehicle.

18. A hanger apparatus comprising:

a mounting plate configured to mount to a cargo vehicle;

a plurality of hook apparatuses mounted to a first side of the mounting plate, wherein each hook apparatus extends out and up from the mounting plate, wherein the plurality of hook apparatuses are positioned in at least two horizontal rows, and wherein the hook apparatuses are staggered horizontally on the first side of the mounting plate; and a plurality of ladder apparatuses non-removably mounted to the first side of the mounting plate, wherein a first ladder apparatus is positioned at a first end of the first side and a second ladder apparatus is positioned at a second end of the first side, and wherein the plurality of hook apparatuses are positioned between the first ladder apparatus and the second ladder apparatus, wherein each ladder apparatus comprises a plurality of horizontal pins to hang an object, the plurality of horizontal pins extending only between side rails, wherein the side rails are mounted to mounting plate and the horizontal pins are spaced apart from the mounting plate, the plurality of hook apparatuses being disposed to one side of the at least one ladder apparatus, wherein both the plurality of hook apparatuses and the at least one ladder are disposed within a bound of the mounting plate; and a plurality of track connectors mounted to the second side of the mounting plate, wherein the second side is an opposite side to the first side of the mounting plate, wherein the plurality of track connectors are configured to couple the hanger apparatus to the track, and wherein the plurality of track connectors are oriented in a same direction, wherein the plurality of track connectors are configured to couple to a single track.

* * * * *